(12) United States Patent
Jenks et al.

(10) Patent No.: US 6,747,224 B1
(45) Date of Patent: Jun. 8, 2004

(54) INTEGRATED KEYPAD INTERFACE FOR A PERSONAL DIGITAL ASSISTANT DEVICE

(75) Inventors: Kenneth Jenks, Capitola, CA (US); Troy Hulick, San Jose, CA (US); Huy Nguyen, San Jose, CA (US); Steven Shiozaki, Belmont, CA (US)

(73) Assignee: palmOne, Inc., Milpitas, CA (US)

( * ) Notice: Subject to any disclaimer, the term of this patent is extended or adjusted under 35 U.S.C. 154(b) by 240 days.

(21) Appl. No.: 09/819,593

(22) Filed: Mar. 27, 2001

(51) Int. Cl.$^7$ ................................................. H01H 19/04
(52) U.S. Cl. ...................... 200/333; 200/511; 200/302.1
(58) Field of Search ................................. 200/333, 511, 200/512, 302.1, 302.2, 5 A

(56) References Cited

U.S. PATENT DOCUMENTS

| | | | | |
|---|---|---|---|---|
| 4,439,647 A | * | 3/1984 | Calandrello et al. | ......... 200/5 A |
| 4,628,408 A | * | 12/1986 | Kimura | ....................... 361/395 |
| 4,801,768 A | * | 1/1989 | Sugiyama et al. | .......... 200/5 A |
| 5,219,067 A | * | 6/1993 | Lima et al. | ............... 200/302.2 |
| 5,373,055 A | * | 12/1994 | Ohmae et al. | ................. 525/64 |
| 5,734,137 A | * | 3/1998 | Wakefield | ................... 200/5 A |
| 6,172,620 B1 | * | 1/2001 | Brick et al. | .................... 341/22 |

* cited by examiner

Primary Examiner—Lincoln Donovan
Assistant Examiner—K. Lee
(74) Attorney, Agent, or Firm—Wagner, Murabito & Hao LLP

(57) ABSTRACT

One embodiment in accordance with the present invention includes a "plug-in" button module for a personal digital assistant (PDA). Specifically, the "plug-in" button module includes a button frame module having a membrane layer (e.g., thermo-plastic urethane or thermo-plastic elastomer) molded over it. The plug-in module can be snapped into the PDA over its button array. In this manner, the plug-in button module provides a seal for the buttons of the PDA that restricts dirt, grim, and other foreign particles from getting underneath them. Furthermore, since the plug-in button module is modular, it can be manufactured separately from the rest of the PDA in a wide variety of ways. For example, the membrane layer of the plug-in button module can be fabricated with different shapes, colors, hardnesses, decorations, textures, and opacities. In this manner, a user is able to personalize their PDA by snapping in a particular plug-in button module.

40 Claims, 14 Drawing Sheets

INTEGRATED KEYPAD INTERFACE FOR A PERSONAL DIGITAL ASSISTANT DEVICE

TECHNICAL FIELD

The present invention generally relates to the field of electronic devices. More particularly, the present invention relates to the field of personal digital assistants (PDAS) or other types of portable electronic devices.

BACKGROUND ART

Computers and other electronic devices have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and via video teleconferencing. Furthermore, computers along with other types of electronic devices which are coupled to the Internet provide their users access to data and information from all over the world. Computer systems have become useful in many aspects of everyday life both for personal and business uses.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the personal digital assistant. A personal digital assistant is a portable computer system which is small enough to be held in the hand of its user and can be "palm-sized."

Since personal digital assistants are very small, full-sized keyboards are generally not efficient input devices. For instance, personal digital assistants using keyboards usually have keyboard devices that are so small that a user typically cannot touch-type on them. Many personal digital assistants employ a stylus and a digitizer pad as an input system. The stylus and digitizer pad work well for personal digital assistants because the arrangement allows a user to hold the personal digital assistant in one hand while writing with the stylus onto the digitizer pad with the other hand. A small on-screen keyboard image can also be used for data entry. Because of the elimination of the keyboard, personal digital assistants are very portable and tend to be carried by the user wherever they go, including on travel.

Furthermore, the personal digital assistant is usually a battery powered device that is typically used as an electronic organizer having the capability to store and display a wide range of information which can include numerous addresses and telephone numbers of business and personal acquaintances, financial information, daily appointments, "to do" list, along with various other personal information. In this manner, the personal digital assistant is able to consolidate a variety of information which is easily accessible by its user. Therefore, personal digital assistants are very useful and powerful devices.

It should be appreciated that there are disadvantages associated with personal digital assistants. For example, between the top cover and parameter of each button of a typical personal digital assistant there is a gap which is an entrance area for dirt and/or grim that is capable of stopping one or more of the buttons from functioning properly. Specifically, the activation travel distance of each button of the typical personal digital assistant may be as small as 0.3 millimeters (mm). As such, particles of dirt and/or grim (e.g., from a user's hand) may get underneath one (or more) of the buttons via the parameter gaps surrounding the buttons and thereby obstruct its very small functional movement.

DISCLOSURE OF THE INVENTION

Accordingly, a need exists for a method and apparatus that provides a seal for the buttons of a personal digital assistant that restricts dirt, grim, and other foreign particles from getting underneath them. Embodiments of the present invention provide a method and apparatus which accomplish the above mentioned need.

One embodiment in accordance with the present invention includes a "plug-in" button module for a personal digital assistant (PDA). Specifically, the "plug-in" button module includes a button frame module having a flexible membrane layer (e.g., thermo-plastic urethane or thermo-plastic elastomer) molded over it. The plug-in module can be snapped into the personal digital assistant over its button array. In this manner, the plug-in button module provides a seal for the buttons of the personal digital assistant that restricts dirt, grim, and other foreign particles from getting underneath them. Furthermore, since the plug-in button module is modular, it can be manufactured separately from the rest of the personal digital assistant in a wide variety of ways. For example, the membrane layer of the plug-in button module can be fabricated with different shapes, colors, hardnesses, decorations, textures, and opacities. In this manner, a user is able to personalize their personal digital assistant by snapping in a particular plug-in button module.

In another embodiment, the present invention includes a removable button module for covering a button of a portable computing device. The removable button module includes a button frame module forming a cavity that aligns with the button of the portable computing device. Furthermore, the removable button module includes a membrane layer disposed on an outer side of the button frame module and covering an opening of the cavity. It is understood that the removable button module is for attaching to the portable computing device to cover the button of the portable computing device. The membrane layer is disposed over the button frame module when the removable button module is attached to the portable computing device to cover the button.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of fed the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

An embodiment of the present invention may be incorporated with a portable computing device such as a personal digital assistant computing device. It should be understood that the descriptions corresponding to FIGS. 1–5 provide some general information about personal digital assistants.

Figure 1:
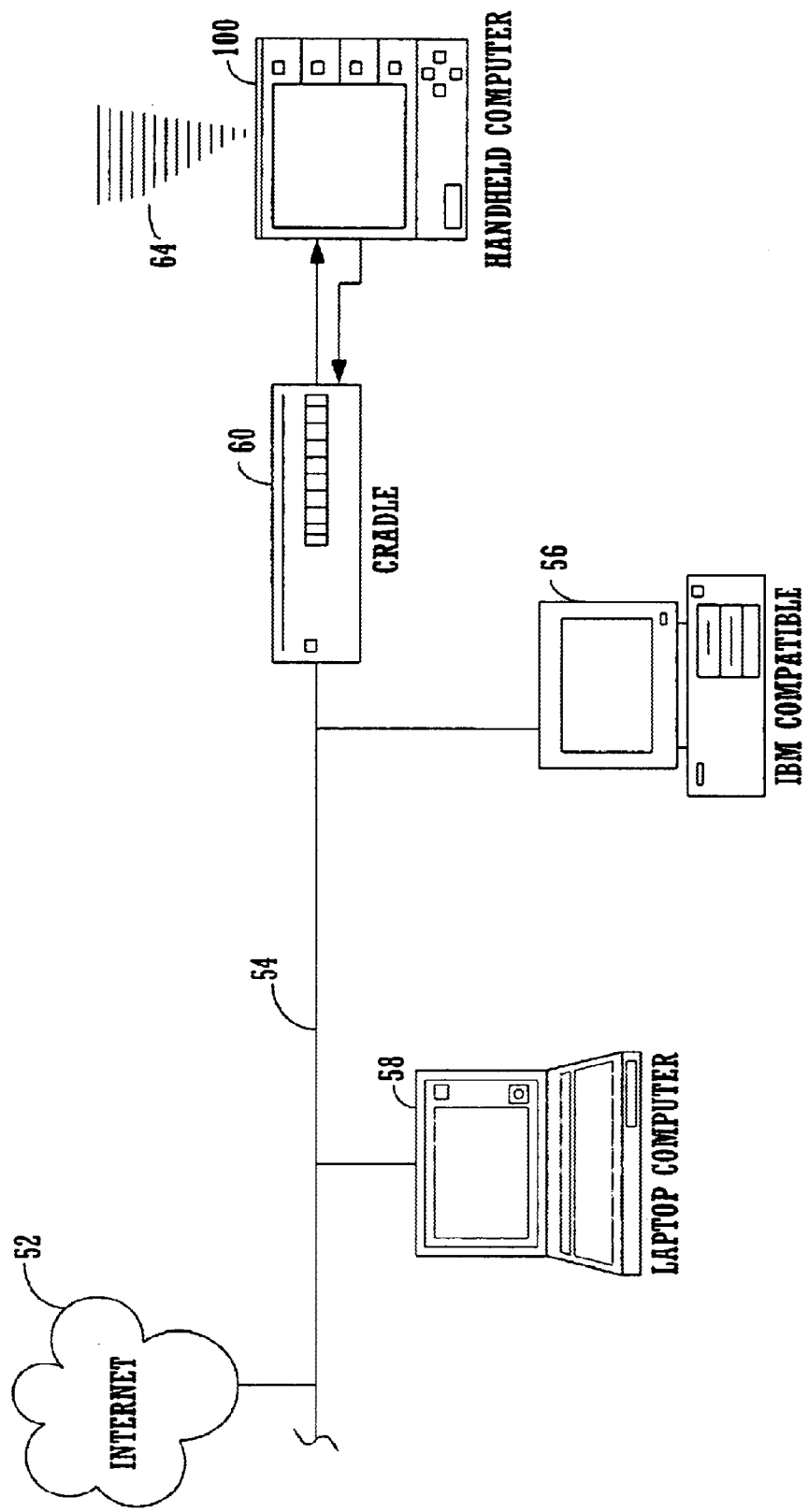
FIG. 1 is a system illustration of a personal digital assistant connected to other computer systems and the Internet via a cradle device.

FIG. 1 illustrates a system 50 that may be used in conjunction with a personal digital assistant computer system 100. Specifically, system 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with personal digital assistant 100. Cradle 60 provides an electrical and mechanical communication interface between bus 54 (and anything coupled to bus 54) and the portable computer system 100 for two way communications. Computer system 100 also contains a wireless infrared communication mechanism 64 for sending and receiving information from other devices.

Figure 2A:
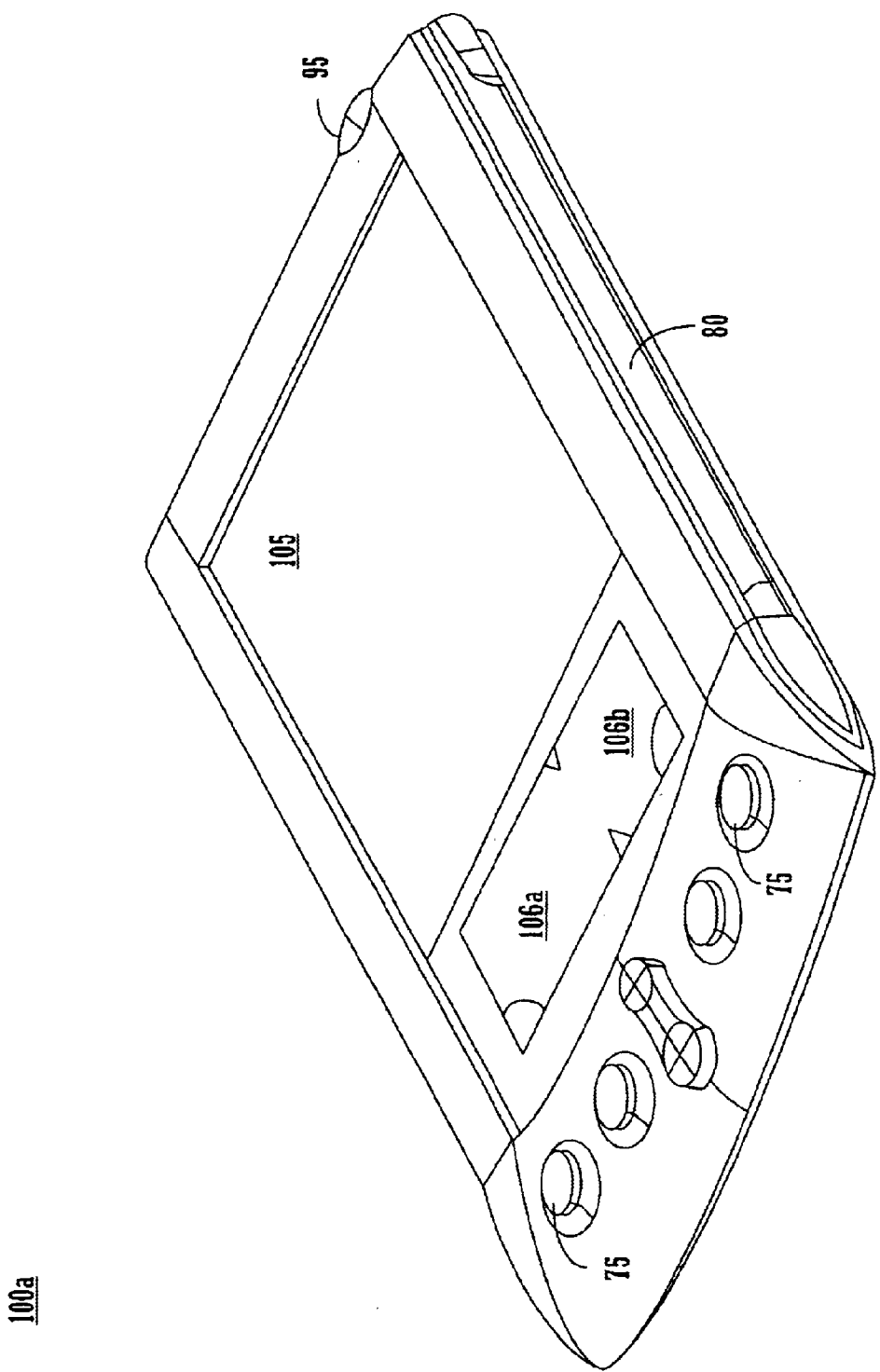
FIG. 2A is a top side perspective view of an exemplary personal digital assistant computer system.

FIG. 2A is a perspective illustration of the top face 100a of an exemplary personal digital assistant computer system. The top face 110a contains a display screen 105 surrounded by a bezel or cover. A removable stylus 80 is also shown. The display screen 105 is a touch screen able to register contact between the screen and the tip of the stylus 80. The stylus 80 can be fabricated of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. For example, region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
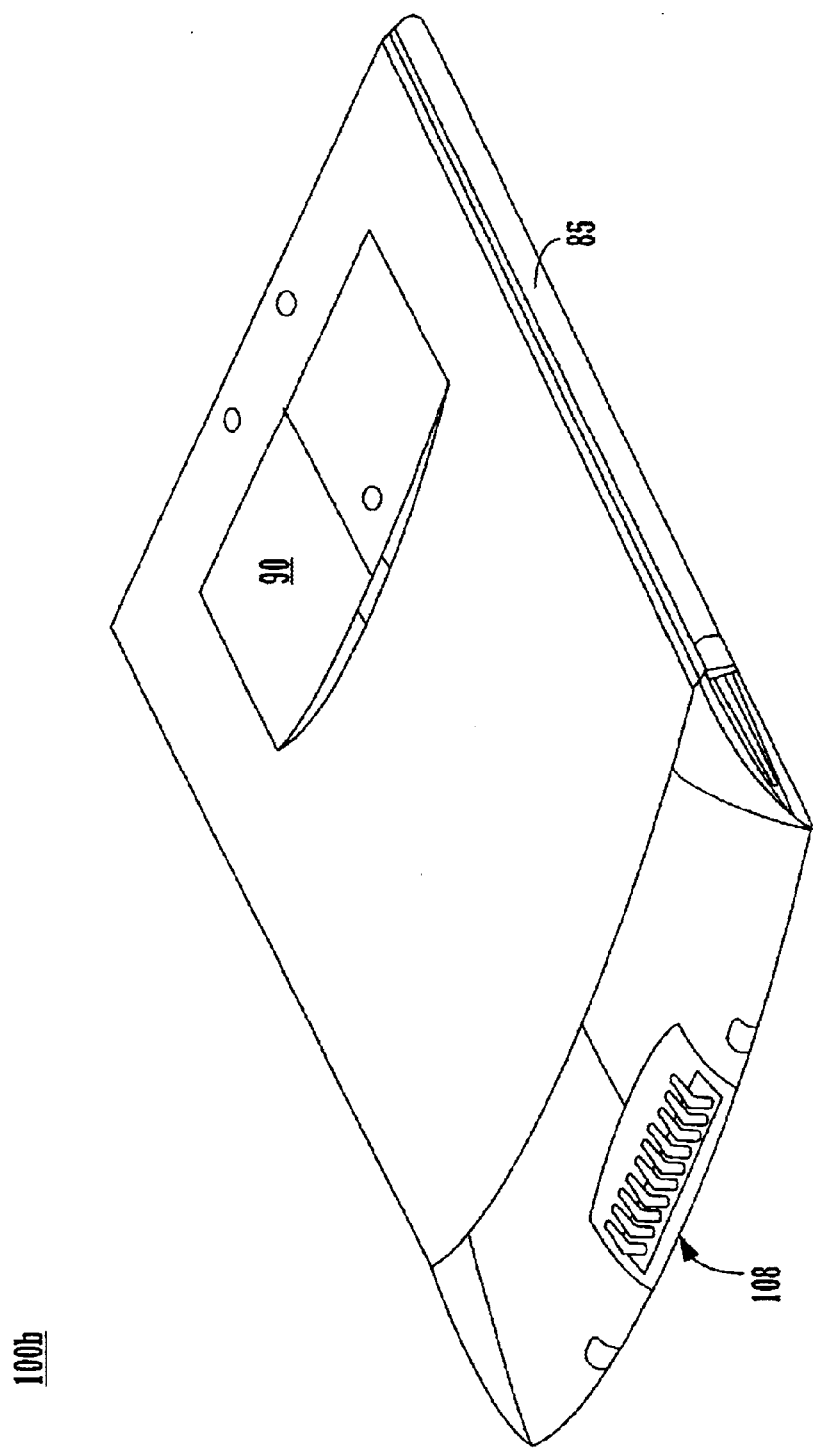
FIG. 2B is a bottom side perspective view of the personal digital assistant of FIG. 2A.

FIG. 2B illustrates the bottom side 100b of one embodiment of the personal digital assistant computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, small computer system interface (SCSI), Ethernet, Firewire (IEEE 1394), Universal Serial Bus (USB), etc.

Figure 3:
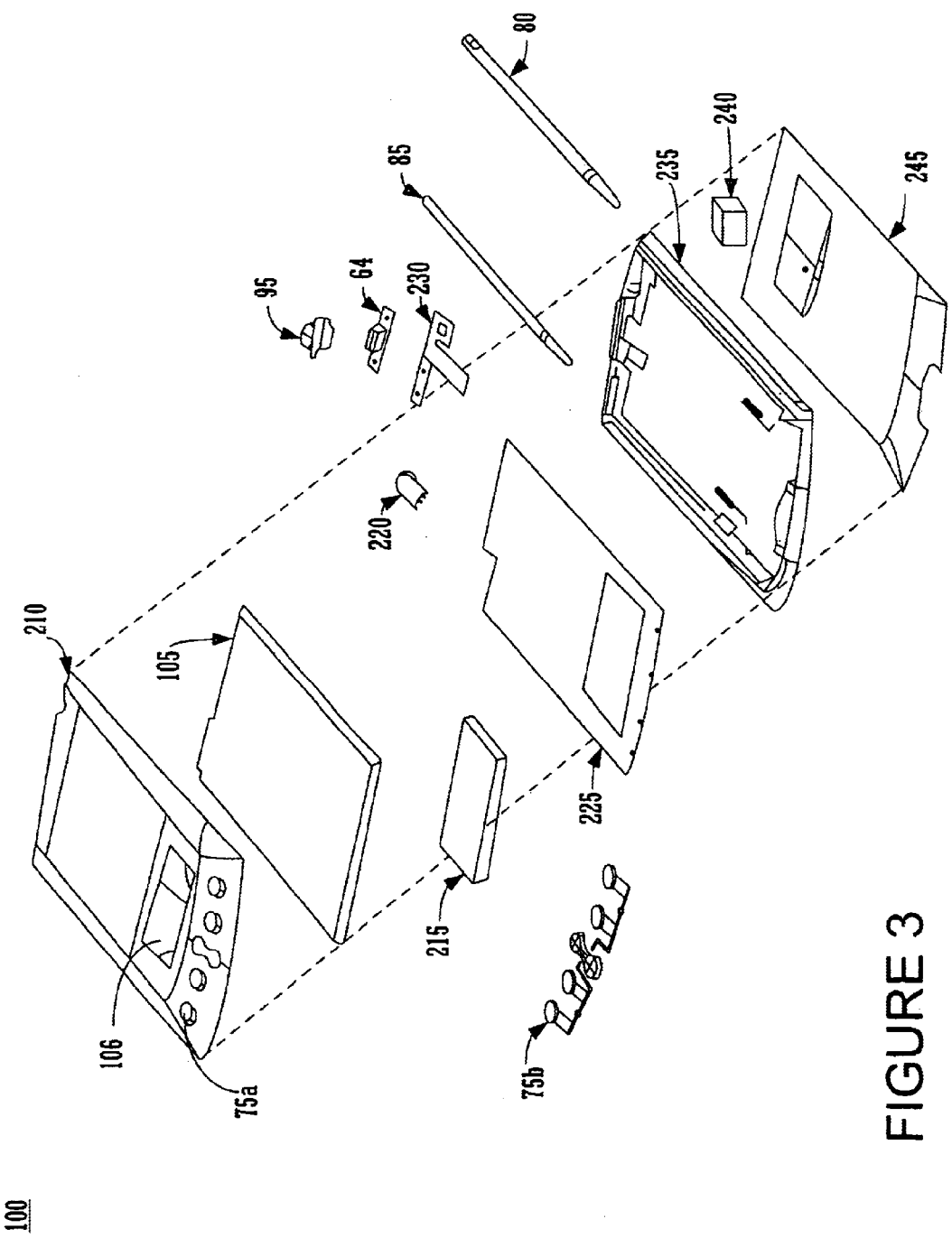
FIG. 3 is an exploded view of the components of the personal digital assistant of FIG. 2A.

FIG. 3 is an exploded view of the personal digital assistant computer system 100. Computing device 100 contains a top cover 210 having an outline of region 106 and holes 75a for receiving a button array 75b. A flat panel display 105 (both liquid crystal display and touch screen) fits into top cover 210. It is appreciated that any of a number of display technologies can be used, e.g., liquid crystal display (LCD), field emission device (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is also shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server.

Figure 4:
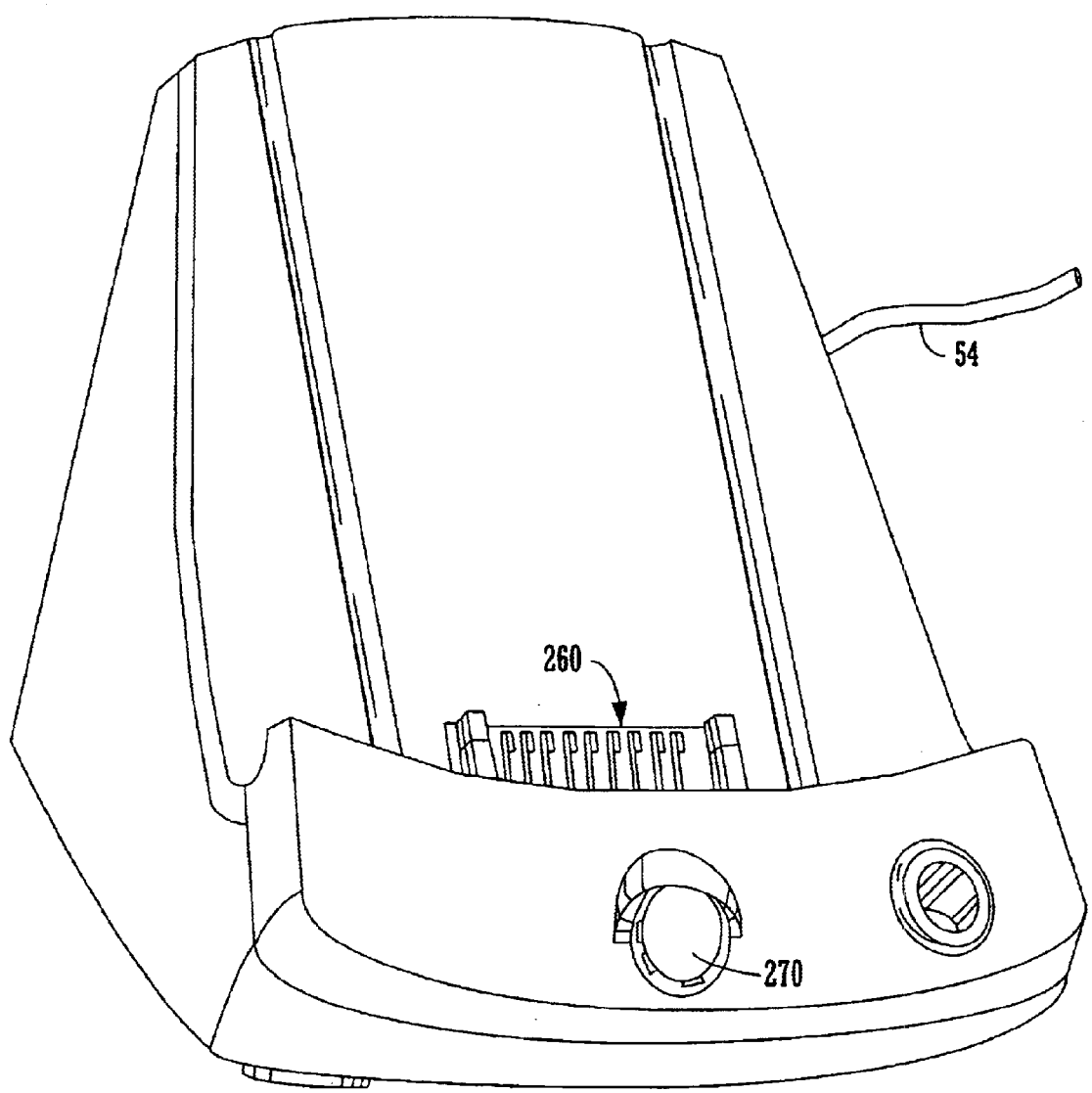
FIG. 4 is a perspective view of the cradle device for connecting the personal digital assistant to other systems via a communication interface.

FIG. 4 is a perspective illustration of one embodiment of the cradle 60 for receiving the personal digital assistant computer system 100. The cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 54.

Figure 5:
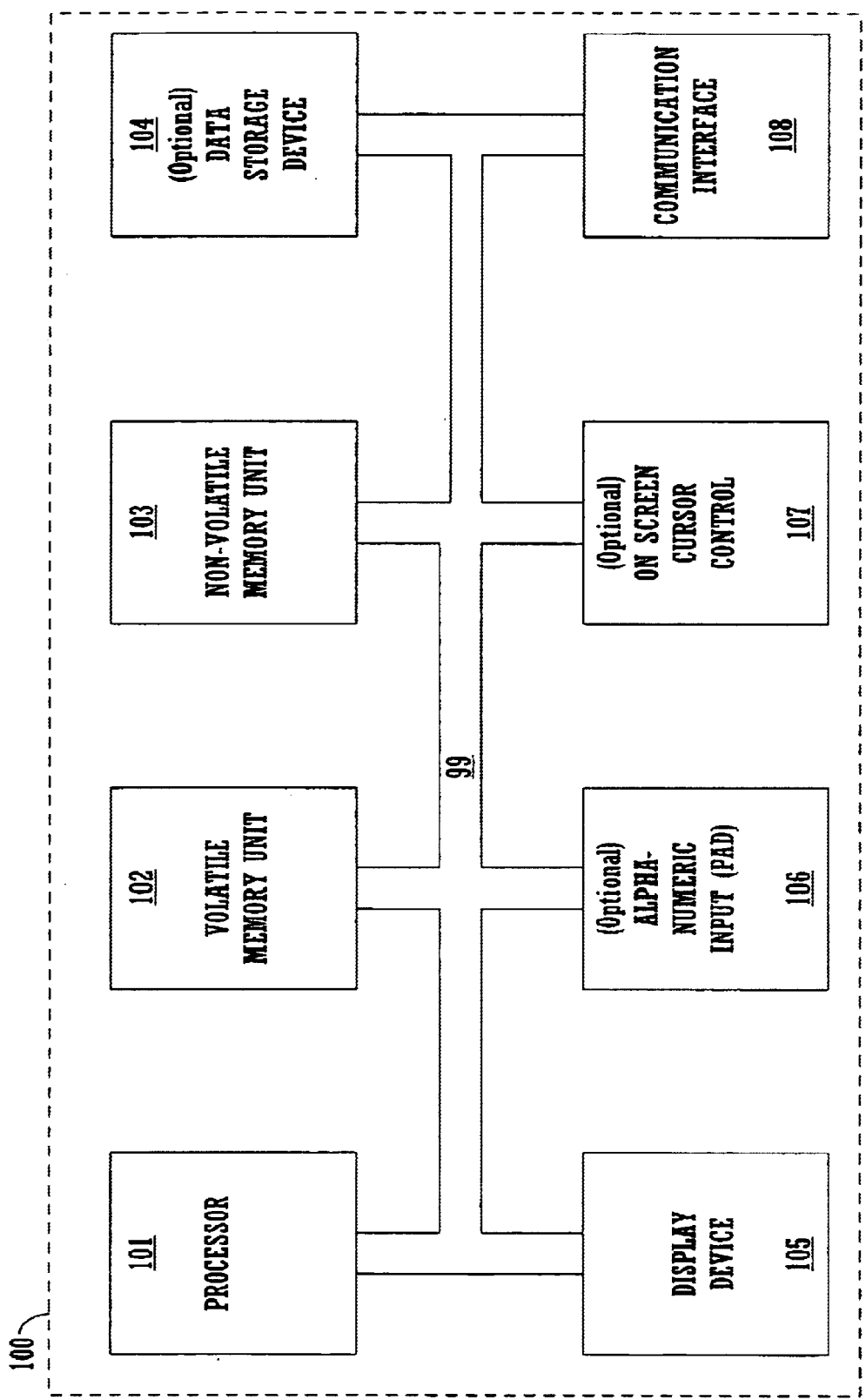
FIG. 5 is a logical block diagram of exemplary circuitry of the personal digital assistant of FIG. 2A.

FIG. 5 is a block diagram of exemplary circuitry of computer system 100, some of which can be implemented on PC board 225. The personal digital assistant 100 includes an address/data bus 99 for communicating information, a central processor 101 coupled with the bus 99 for processing information and instructions. Central processor unit 101 may be a microprocessor or any other type of processor. The computer system 100 also includes data storage features such as a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. Computer system 100 may also include an optional data storage device 104 (e.g., memory stick) coupled with the bus 99 for storing information and instructions. It should be appreciated that device 104 can be removable. As described above, system 100 also contains a display device 105 coupled to the bus 99 for displaying information to the computer user. It is understood that PC board 225 can contain the processor 101, the bus 99, the volatile memory unit 102, and the non-volatile memory unit 103.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where a stylus makes contact. The display device 105 utilized with the computer system 100 may be a liquid crystal device (LCD), cathode ray tube (CRT), field emission device (FED, also called flat panel CRT) or other display device suitable for creating graphic images and alphanumeric characters recognizable to the user. In the preferred embodiment, display 105 is a flat panel display. Computer system 100 also includes signal communication device 108, which is also coupled to bus 99, and can be a serial port for communicating with the cradle 60. Device 108 can also in include an infrared communication port.

Exemplary Plug-in Button Module in Accordance with the Present Invention

Figure 6:
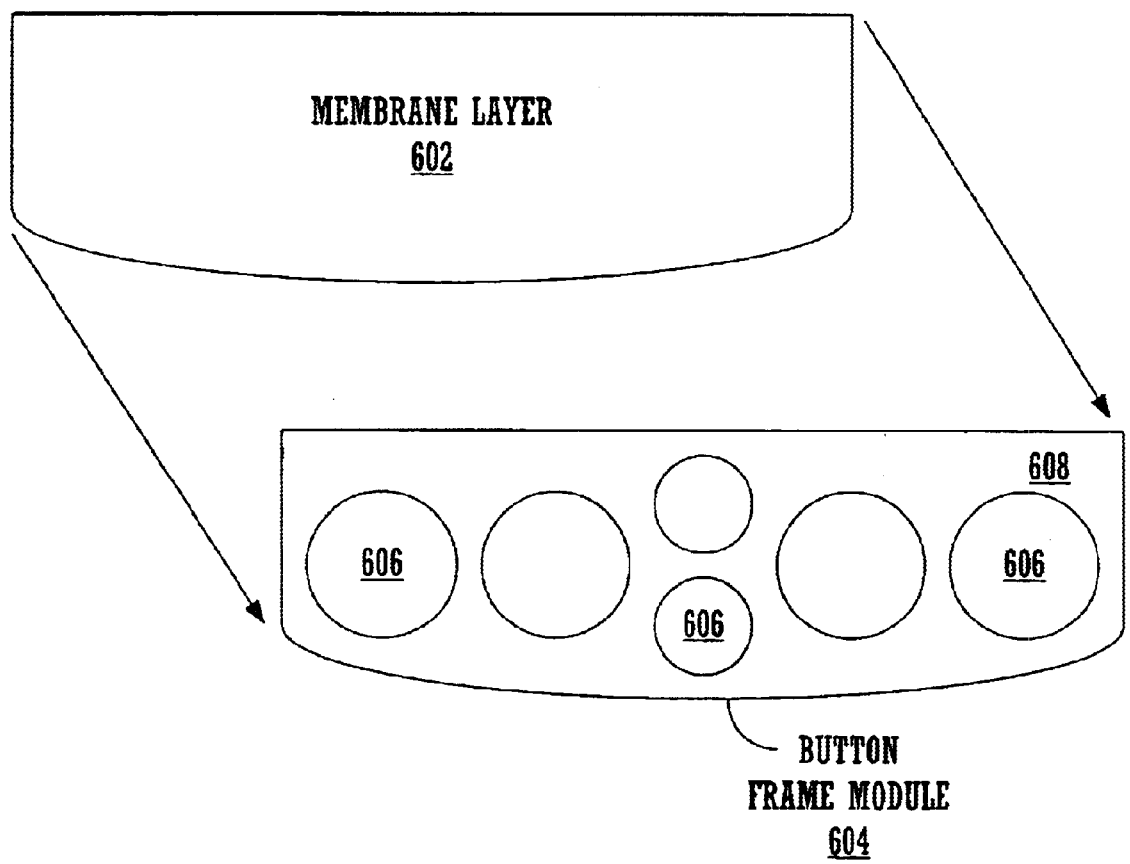
FIG. 6 is a top view of components of an exemplary "plug-in" button module in accordance with an embodiment of the present invention.
Figure 7:
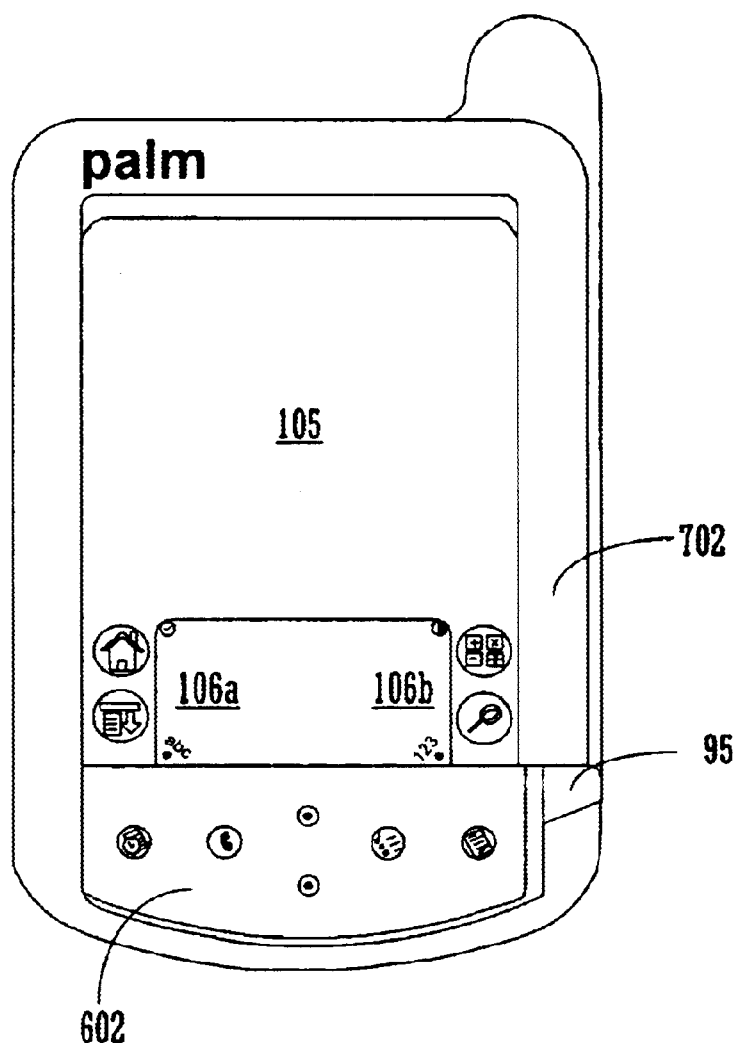
FIG. 7 is a top view of an exemplary personal digital assistant implemented with a "plug-in" button module in accordance with an embodiment of the present invention.

It should be appreciated that FIGS. 6 and 7 are described in conjunction in order to more fully describe the structure of the present embodiment. FIG. 6 is a top view of components of an exemplary "plug-in" button module 600 in accordance with an embodiment of the present invention. Additionally, FIG. 7 is a top view of an exemplary personal digital assistant 700 implemented with the "plug-in" button module 600 in accordance with an embodiment of the present invention. Specifically, the plug-in button module 600 (FIG. 6) includes a button frame module 604 and a flexible membrane layer 602 that is molded over or attached to an outer side 608 of button frame module 604. Since the plug-in button module 600 is modular, it can be manufactured separately from the rest of the personal digital assistant 700 in a wide variety of ways. For example, the flexible membrane layer 602 of the plug-in button module 600 can be fabricated having different shapes, colors, hardnesses, decorations, textures, and opacities. In this manner, a user is able to personalize their personal digital assistant (e.g., 700) by attaching or detaching a particular plug-in button module (e.g., 600).

There are advantages associated with the plug-in button module 600 of the present embodiment. One of the advantages is that the button module 600 provides more flexibility during the assembly of personal digital assistants (e.g., 700). For example, some manufacturers of personal digital assistants are moving toward painted products. By using the plug-in button module 600, the manufacturer may color the membrane 602 in order to match the color of the painted color of the top cover (e.g., 702) of the personal digital assistant 700. Furthermore, the manufacturer may color the membrane 602 in order to compliment the color of the painted color of the top cover of the personal digital assistant 700. Another advantage associated with the plug-in button module 600 is that its membrane layer 602 and button frame module 604 may be fabricated with different materials that may provide different benefits. However, these different materials may have different shrink rates. As such, it is easier to work with these different materials when working with button module 600 instead of working with a whole top cover (e.g., 210) of a personal digital assistant.

It is understood that personal digital assistant 700 of FIG. 7 has similar components and functionality as personal digital assistant 100 described above with reference to FIGS. 1–5. However, top cover 702 of personal digital assistant 700 does not cover its button array (e.g., 75b) in the manner that computer system 100 is shown. Instead, plug-in button module 600 is designed to attach to personal digital assistant 700 over its button array (not shown). In this manner, the plug-in button module 600 provides a seal for the buttons (e.g., 75) of the personal digital assistant 700 which restricts dirt, grim, and other foreign particles from getting underneath them. It is appreciated that the buttons (e.g., 75) of personal digital assistant 700 located underneath the membrane layer 602 may be flat, concave, and/or convex in accordance with the present embodiment.

The flexible membrane layer 602 of the plug-in button module 600 of FIGS. 6 and 7 may be fabricated from a wide variety of materials. For example, the membrane layer 602 may include thermo-plastic urethanes (TPUs), thermoplastic elastomers (TPEs), silicones, rubbers, leathers, nylons, and the like. It should be understood that membrane layer 602 of the present embodiment is not limited to these particular materials. Additionally, the button frame module 604 of the plug-in button module 600 may also be fabricated from a wide variety of materials. For example, the button frame module 604 may be fabricated from polycarbonites, plastics, metals, alloys, nylons, and the like. However, button frame module 604 of the present embodiment is not limited to these particular materials.

The button frame module 604 of FIG. 6 also includes vertical cavities (holes) 606 which match the configuration of the button array (e.g., 75*b*) that is implemented with personal digital assistant 700. In this manner, the vertical cavities 606 align with and accept the button array of personal digital assistant 700. As such, the button frame module 604 fits over the button array (e.g., 75*b*) and attaches to the personal digital assistant 700 while the flexible membrane layer 602 completely conceals the buttons from view as shown in FIG. 7. It is appreciated that when button module 600 is attached to personal digital assistant 700, the membrane layer 602 may be touching (or located very close to) the buttons (e.g., 75) of personal digital assistant 700. Therefore, a user of personal digital assistant 700 is able to activate one of its buttons (e.g., 75) by apply increasing pressure to the flexible membrane layer 602 located above the desired button until the button's activation travel distance is reached.

FIG. 7 illustrates one embodiment of the flexible membrane layer 602 of the "plug-in" button module 600 in accordance with the present invention that is fabricated from a material that may accept pad printing of (for example) different icons. Furthermore, some of the materials of the membrane layer 602 that accept pad printing may need to have an overcoat process performed on top of the pad printing. The purpose for the overcoat process is to protect the pad printing from wearing off too quickly from the membrane layer 602. It is understood that the overcoat process may include different overcoat materials in accordance with the present embodiment.

Within another embodiment (not shown) of flexible membrane layer 602 of the plug-in button module 600, different icons may be imprinted into the material of membrane layer 602 in accordance with the present invention. Moreover, in yet another embodiment (not shown) of flexible membrane layer 602 of the plug-in button module 600, pad printing may be performed into icons that have been imprinted into the material of membrane layer 602 in accordance with the present invention.

The stiffness of the membrane layer 602 of the present embodiment of FIGS. 6 and 7 may include a durometer reading as low as 40 but not as high as 70. However, the membrane layer 602 the present embodiment is not restricted by this durometer range. Instead, the membrane layer 602 the present embodiment is well suited to be implemented with a material having any durometer reading.

Figure 8A:
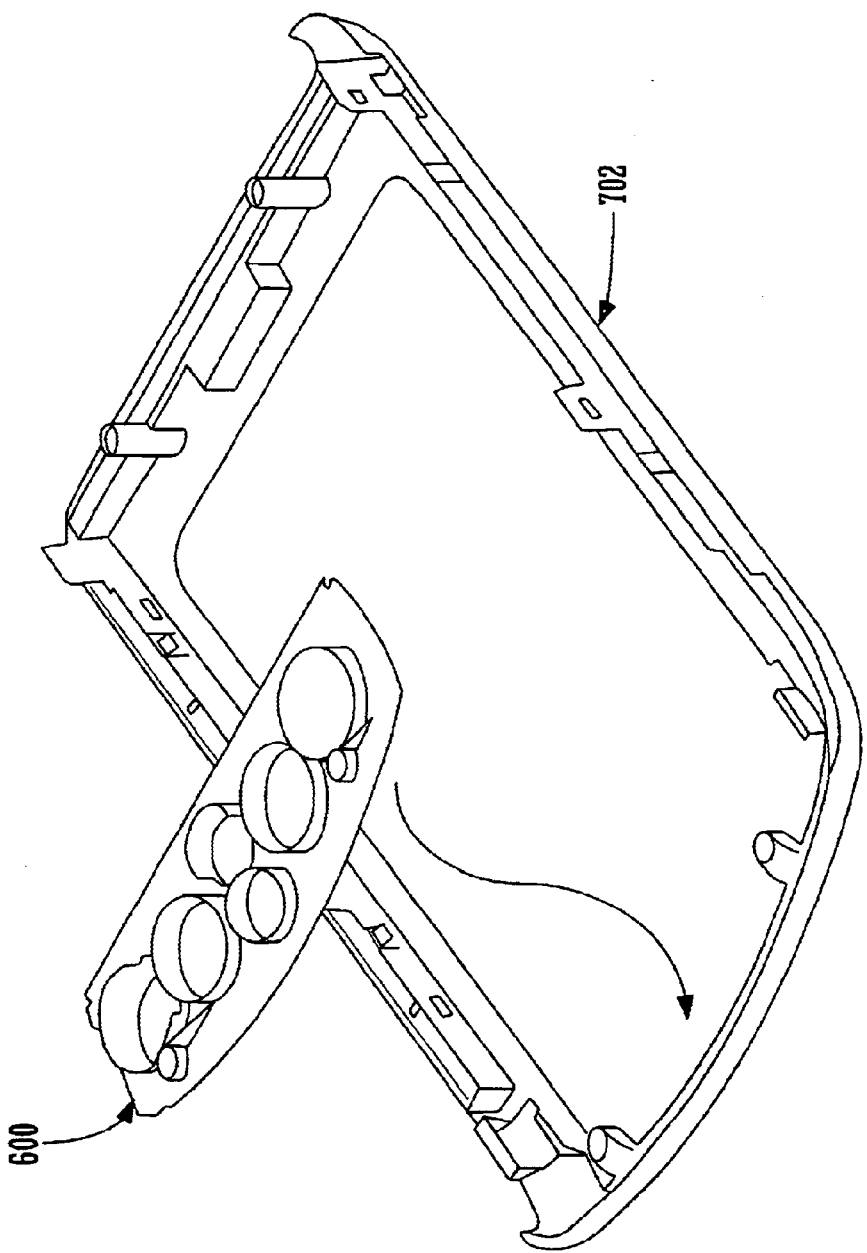
FIGS. 8A and 8B are perspective views illustrating one embodiment of how a "plug-in" button module can be coupled to a top cover of a personal digital assistant in accordance with the present invention.
Figure 8B:
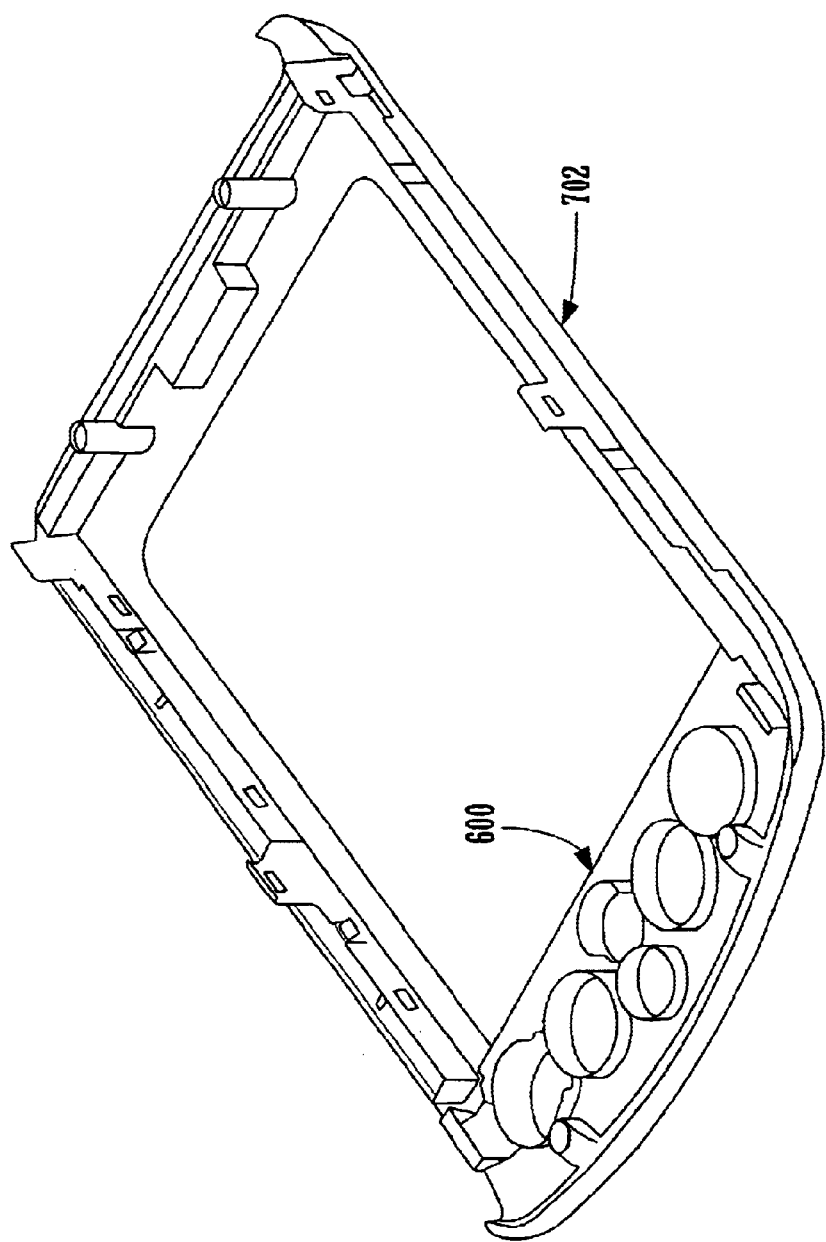

FIGS. 8A and 8B are perspective views illustrating one embodiment of how plug-in button module 600 can be attached to the top cover 702 of personal digital assistant 700. It is appreciated that the top cover 702 of personal digital assistant 700 and the plug-in button module 600 are shown facing downward. As such, FIG. 8A provides a backside view of the top cover 702 and the plug-in button module 600. Within the present embodiment, FIG. 8B illustrates that the plug-in button module 600 attaches into the top case 702 from its backside and then the combined unit would be attached to the rest of the components of personal digital assistant 700. It should be understood that this kind of assembling may be done by the manufacturer of personal digital assistant devices.

In another embodiment (not shown) of the present invention, the plug-in button module 600 may be designed to be removably attached to the midframe (e.g., 235) instead of the top case 702 of the personal digital assistant 700. In this manner, a user of personal digital assistant 700 may be able to physically attach and detach the plug-in button module 600 to the midframe (e.g., 235) of personal digital assistant 700. Therefore, the user is able to attach and detach different types of plug-in button modules (e.g., 600) as desired.

Moreover, in yet another embodiment (not shown) of the present invention, the plug-in button module 600 may be designed to be removably attached to the top cover 702 from its front-side. In this manner, a user of personal digital assistant 700 may be able to physically attach and detach the plug-in button module 600 to the top cover 702 of personal digital assistant 700. As such, the user is able to attach and detach different types of plug-in button modules (e.g., 600) as desired.

Figure 9:
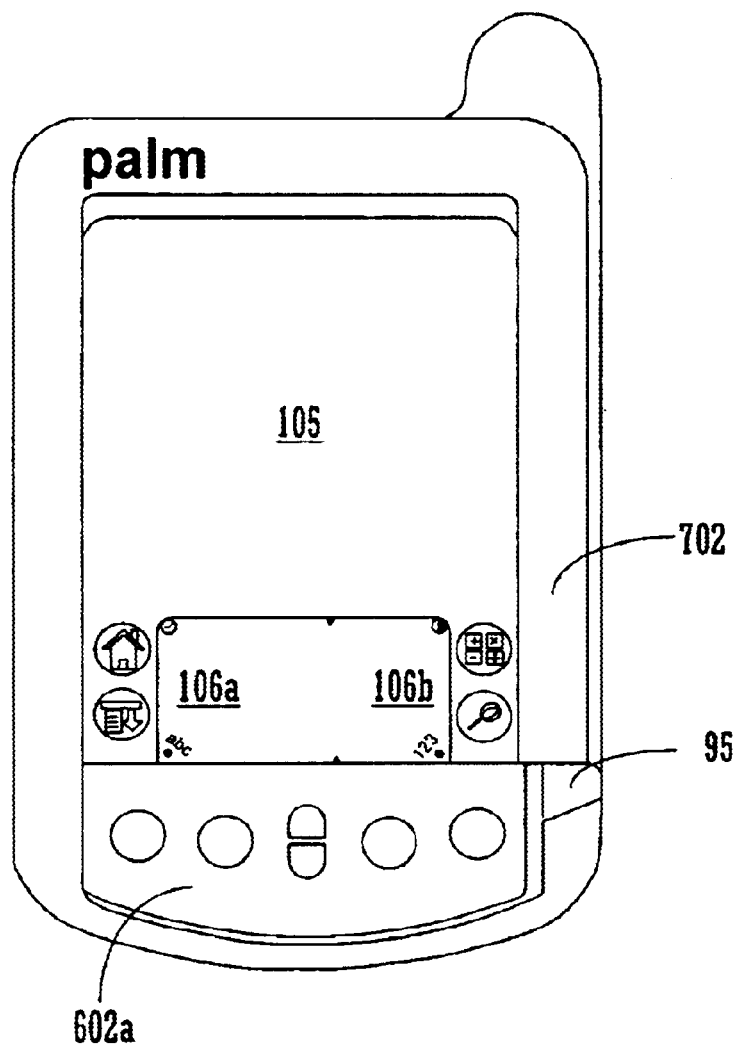
FIG. 9 is a top view of an exemplary personal digital assistant implemented with another plug-in button module in accordance with an embodiment of the present invention.

FIG. 9 is a top view of an exemplary personal digital assistant 700*a* implemented with a "plug-in" button module 600*a* in accordance with an embodiment of the present invention. Specifically, personal digital assistant 700*a* of FIG. 9 is similar to personal digital assistant 700 of FIG. 7. However, personal digital assistant 700*a* is implemented with the plug-in module 600*a* that has a raised button shape. As mentioned above, it is understood that the flexible membrane layer 602*a* may be fabricated to have different shapes in accordance with the present embodiment.

Figure 10:
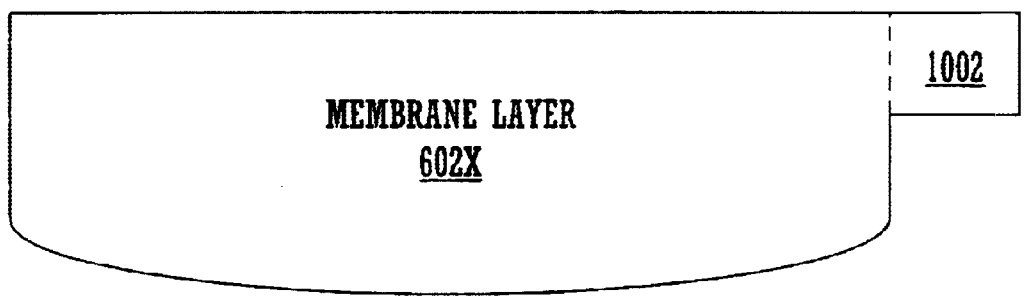
FIG. 10 is a top view of another exemplary membrane layer that may be coupled to a plug-in button module in accordance with an embodiment of the present invention.

FIG. 10 is a top view of an exemplary membrane layer 602*x* that may be attached to a button frame module (e.g., 604) in accordance with an embodiment of the present invention. Specifically, membrane layer 602*x* includes a tab 1002 of extra membrane material that extends underneath the power button 95 of personal digital assistant 700 and/or 700*a*. One of the purposes of tab 1002 of membrane layer 602*x* is to supply a return to zero force to the power button 95 so that it returns to a flush position with top case 702 after it has been depressed.

Figure 11:
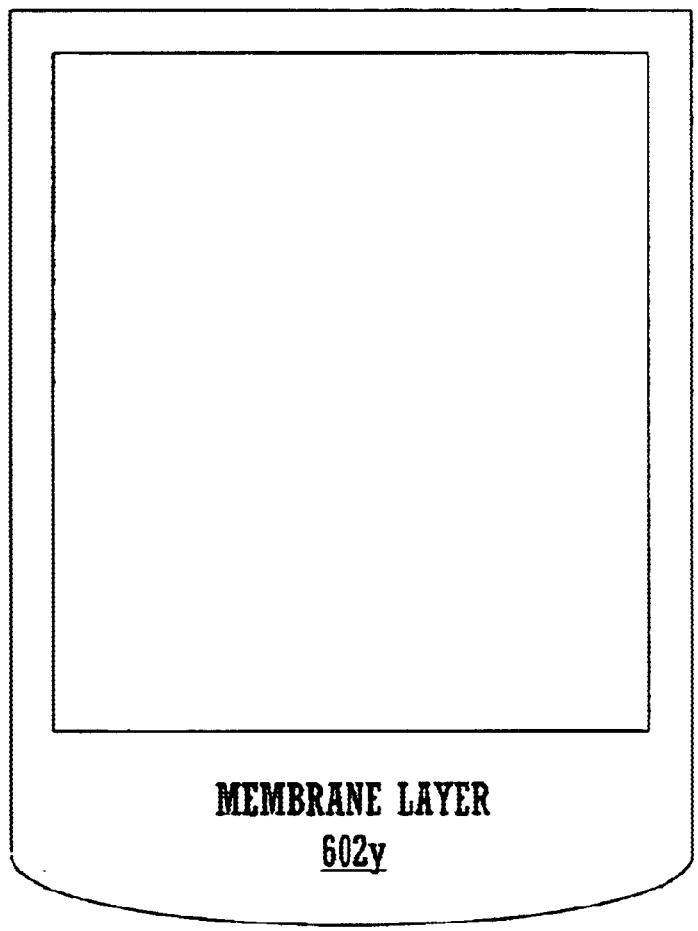
FIG. 11 is a top view of yet another exemplary membrane layer that may be coupled to a plug-in button module in accordance with an embodiment of the present invention.

FIG. 11 is a top view of an exemplary membrane layer 602*y* that may be attached to a button frame module (e.g., 604) in accordance with an embodiment of the present invention. Specifically, membrane 602*y* is fabricated such that it extends around the parameter of the active area of the digitizer area (e.g., 105, 106*a*, and 106*b*) and underneath the display opening of the top cover 702 of personal digital assistant 700 (and/or 700*a*). One of the purposes of membrane 602*y* of the present embodiment is to function as a gasket that seals the front of personal digital assistant 700 (and/or 700*a*) when it is completely assembled and thereby makes it splash proof to liquids. Therefore, personal digital assistant 700 (and/or 700*a*) would not be adversely affected if a liquid was accidentally spilled on the top of it.

Figure 12:
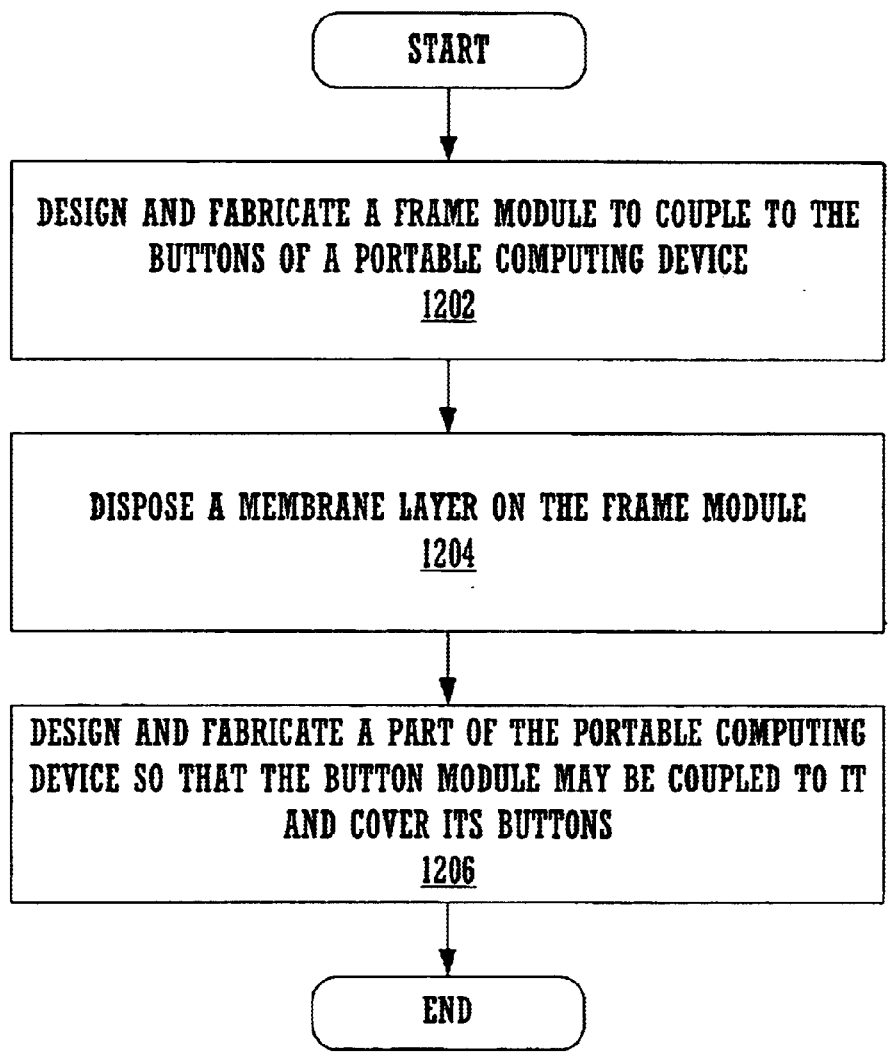
FIG. 12 illustrates a flowchart of steps performed in accordance with one embodiment of the present invention for designing and fabricating an interchangeable button module that covers buttons of a portable computing device.

FIG. 12 illustrates a flowchart 1200 of steps performed in accordance with one embodiment of the present invention for designing and fabricating an interchangeable button module (e.g., 600) that covers buttons of a portable computing device. Although specific steps are disclosed in flowchart 1200, such steps are exemplary. That is, the present invention is well suited to performing various other steps or variations of the steps recited in FIG. 12. Within the present embodiment, it should be appreciated that the steps of flowchart 1200 may be performed by software or hardware or any combination of software and hardware.

At step 1202, the present embodiment designs and fabricates a frame module (e.g., 604) that may be coupled to the buttons (e.g., 75) of a portable computing device. It is appreciated that the frame module of step 1202 may also be designed to cover (but not couple to) the buttons of a portable computing device in accordance with the present embodiment. Additionally, the portable computing device of the present embodiment is well suited to be a wide variety of devices. For example, the portable computing device may be a mobile phone, pager, personal digital assistant (e.g., 700), and the like. Furthermore, the frame module of step 1202 may be fabricate from a wide variety of materials (e.g., polycarbonites, plastics, metals, alloys, nylons, and the like) in accordance with the present embodiment.

In step 1204 of FIG. 12, the present embodiment disposes a membrane layer (e.g., 602) on an outer side of the frame module (e.g., 604). It is understood that at step 1202 the membrane layer may be molded over the frame module or it may be attached to the button frame module in accordance with the present embodiment. Additionally, the membrane layer may include thermoplastic urethanes (TPUs), thermoplastic elastomers (TPEs), silicones, rubbers, leathers, nylons, and the like in accordance with the present embodiment. It is understood that once step 1204 is complete, a button module has been fabricated in accordance with the present embodiment.

At step 1206, the present embodiment designs and fabricates a part of the portable computing device so that the button module (e.g., 600) may be attached to it and cover its buttons (e.g., 75). For example, the part of the portable computing device that the button module may be designed to couple to may include the portable computing device's top cover (e.g., 702), its midframe (e.g., 235), or its rear cover (e.g., 245). After the completion of step 1206, the present embodiment exits flowchart 1200.

Accordingly, embodiments of the present invention provide a method and apparatus that provide a seal for the buttons of a personal digital assistant device that restricts dirt, grim, and other foreign particles from getting underneath them.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A removable button module for covering a button of a portable computing device, said removable button module comprising:
   a button frame module forming a cavity that aligns with said button of said portable computing device; and
   a membrane layer disposed on an outer side of said button frame module and covering an opening of said cavity;
   wherein said removable button module is for removably attaching to said portable computing device to cover said button of said portable computing device, said membrane layer disposed over said button frame module when said removable button module is attached to said portable computing device.

2. The removable button module as described in claim 1 wherein said membrane layer comprises a thermo-plastic urethane (TPU).

3. The removable button module as described in claim 1 wherein said membrane layer comprises a thermoplastic elastomer (TPE).

4. The removable button module as described in claim 1 wherein said membrane layer comprises a silicone.

5. The removable button module as described in claim 1 wherein said membrane layer comprises a rubber.

6. The removable button module as described in claim 1 wherein said membrane layer comprises a leather.

7. The removable button module as described in claim 1 wherein said membrane layer comprises a nylon.

8. The removable button module as described in claim 1 wherein said button frame module comprises a polycarbonite.

9. The removable button module as described in claim 1 wherein said button frame module comprises a plastic.

10. The removable button module as described in claim 1 wherein said button frame module comprises a metal.

11. The removable button module as described in claim 1 wherein said button frame module comprises an alloy.

12. The removable button module as described in claim 1 wherein said button frame module comprises a nylon.

13. The removable button module as described in claim 1 wherein said membrane layer comprises a portion that extends underneath a power button of said portable computing device that supplies a return force to said power button after it has been depressed.

14. The removable button module as described in claim 1 wherein said removable button module couples to a top cover of said portable computing device.

15. The removable button module as described in claim 1 wherein said removable button module couples to a midframe or a rear cover of said portable computing device.

16. The removable button module as described in claim 1 wherein said membrane layer comprises a portion that extends around a parameter of a digitizer area of said portable computing device.

17. A removable button module for covering a button of a portable computing device, said removable button module comprising:
   a button frame module forming a cavity that aligns with said button of said portable computing device; and
   a membrane layer disposed on an outer side of said button frame module and covering an opening of said cavity;
   wherein said removable button module is for removably attaching to said portable computing device to cover said button of said portable computing device and to personalize said portable computing device, said membrane layer disposed over said button frame module when said removable button module is attached to said portable computing device.

18. The removable button module as described in claim 17 wherein said membrane layer comprises a thermo-plastic urethane (TPU).

19. The removable button module as described in claim 17 wherein said membrane layer comprises a thermo-plastic elastomer (TPE).

20. The removable button module as described in claim 17 wherein said membrane layer comprises a silicone.

21. The removable button module as described in claim 17 wherein said membrane layer comprises a rubber.

22. The removable button module as described in claim 17 wherein said membrane layer comprises a leather.

23. The removable button module as described in claim 17 wherein said membrane layer comprises a nylon.

24. The removable button module as described in claim 17 wherein said button frame module comprises a polycarbonite.

25. The removable button module as described in claim 17 wherein said button frame module comprises a plastic.

26. The removable button module as described in claim 17 wherein said button frame module comprises a metal.

27. The removable button module as described in claim 17 wherein said button frame module comprises an alloy.

28. The removable button module as described in claim 17 wherein said button frame module comprises a nylon.

29. The removable button module as described in claim 17 wherein said portable computing device comprises a personal digital assistant (PDA).

30. A removable button module for covering a button of a personal digital assistant, said removable button module comprising:

a button frame module forming a vertical hole that aligns with and accepts said button of said personal digital assistant; and a membrane layer disposed on an outer side of said button frame module and covering an opening of said vertical hole;

wherein said removable button module is for removably attaching to said personal digital assistant to cover said button of said personal digital assistant, said membrane layer disposed over said button frame module when said removable button module is attached to said personal digital assistant to cover said button.

31. The removable button module as described in claim 30 wherein said membrane layer comprises a thermoplastic urethane (TPU).

32. The removable button module as described in claim 30 wherein said membrane layer comprises a thermo-plastic elastomer (TPE).

33. The removable button module as described in claim 30 wherein said membrane layer comprises a silicone.

34. The removable button module as described in claim 30 wherein said membrane layer comprises a rubber.

35. The removable button module as described in claim 30 wherein said membrane layer comprises a nylon.

36. The removable button module as described in claim 30 wherein said button frame module comprises a polycarbonite.

37. The removable button module as described in claim 30 wherein said button frame module comprises a plastic.

38. The removable button module as described in claim 30 wherein said button frame module comprises a metal.

39. The removable button module as described in claim 30 wherein said button frame module comprises an alloy.

40. The removable button module as described in claim 30 wherein said button frame module comprises a nylon.

* * * * *